United States Patent [19]

Miyamoto

[11] Patent Number: 5,444,224
[45] Date of Patent: Aug. 22, 1995

[54] OPTICAL INFORMATION RECORDING/REPRODUCING APPARATUS

[75] Inventor: Moritoshi Miyamoto, Kawasaki, Japan

[73] Assignee: Canon Kabushiki Kaisha, Tokyo, Japan

[21] Appl. No.: 121,545

[22] Filed: Sep. 16, 1993

[30] Foreign Application Priority Data

Sep. 24, 1992 [JP] Japan .................................. 4-277652

[51] Int. Cl.⁶ .............................................. G06K 7/10
[52] U.S. Cl. ..................................................... 235/454
[58] Field of Search ............... 235/454, 436, 437, 474, 235/480, 469; 369/44.37, 44.38, 121, 122

[56] References Cited

U.S. PATENT DOCUMENTS

| | | | |
|---|---|---|---|
| 4,831,243 | 5/1989 | Enari et al. | 235/436 |
| 5,113,378 | 5/1992 | Kimura | 369/44.38 X |
| 5,247,505 | 9/1993 | Shikichi et al. | 369/54 |
| 5,267,226 | 11/1993 | Matsuoka et al. | 235/454 X |
| 5,293,032 | 3/1994 | Urshan | 235/454 |

FOREIGN PATENT DOCUMENTS 2580850 10/1986 France .
61-240408 10/1986 Japan .

OTHER PUBLICATIONS

Patent Abstracts of Japan, No. 02-301019, vol. 15, No. 84, Feb. 1991.
Takagi, et al., "Slit-Shape Edge Emitting LED Specially Designed for Optical Card Reader/Writer," Lasers and Electro-Optics Society Annual Meeting Conference Proceedings, Oct. 1989, Orlando, Fla., pp. 20, 62 and 63 (IEEE Catalog No. 89CH 2641-9).

*Primary Examiner*—Donald Hajec
*Assistant Examiner*—Then Minh Le
*Attorney, Agent, or Firm*—Fitzpatrick, Cella, Harper & Scinto

[57] ABSTRACT

An optical information recording/reproducing apparatus includes a first spot forming system for forming a first recording light spot and a second recording light spot for recording information on an information recording medium, a second spot forming system for forming a first reproducing light spot and a second reproducing light spot for reproducing information from the information recording medium, and a moving device for effecting a relative reciprocating motion between the first and second spot forming systems and the information recording medium. The spot forming systems form the recording light spots and the reproducing light spots in a particular arrangement.

14 Claims, 7 Drawing Sheets

OPTICAL INFORMATION RECORDING/REPRODUCING APPARATUS

BACKGROUND OF THE INVENTION

1. Field of the Invention

The present invention relates to an optical information recording/reproducing apparatus, for example, a reader-writer an for optical card, in which a plurality of beams are guided simultaneously to irradiate a reciprocating information recording medium and to form light spots thereon, so as to enable recording and verification (immediate reproduction of recorded information) both forward and backward in the reciprocating motion of the recording medium.

2. Related Background Art

Figure 1:
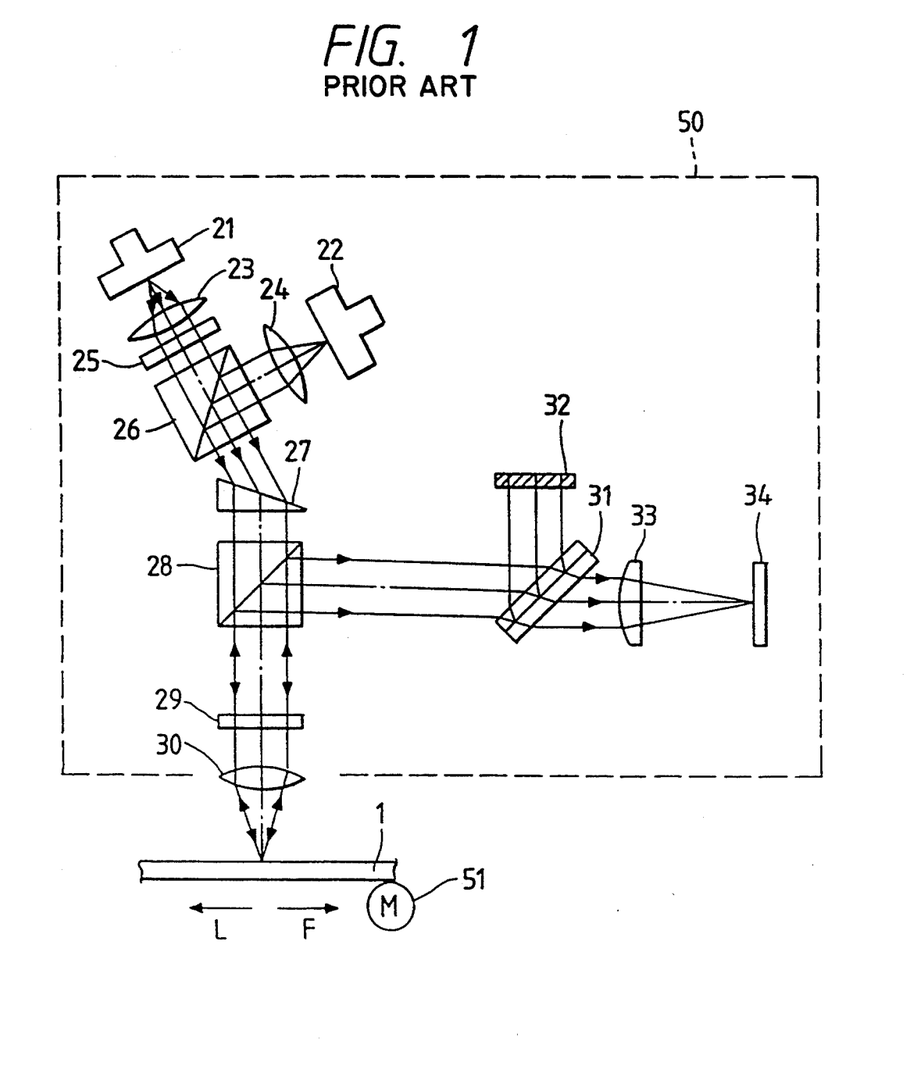
FIG. 1 is a constitutional drawing to show a conventional optical information recording/reproducing apparatus.

A typical example of such an optical information recording/reproducing apparatus is an optical card information recording/reproducing apparatus having the structure as shown in FIG. 1, which is conventionally used. In the apparatus, recording and reproduction of information are carried out with beams from separate light sources (which is generally called a double light source method) to avoid degradation of reproducing light and to achieve high speed recording with verification.

Figure 2:
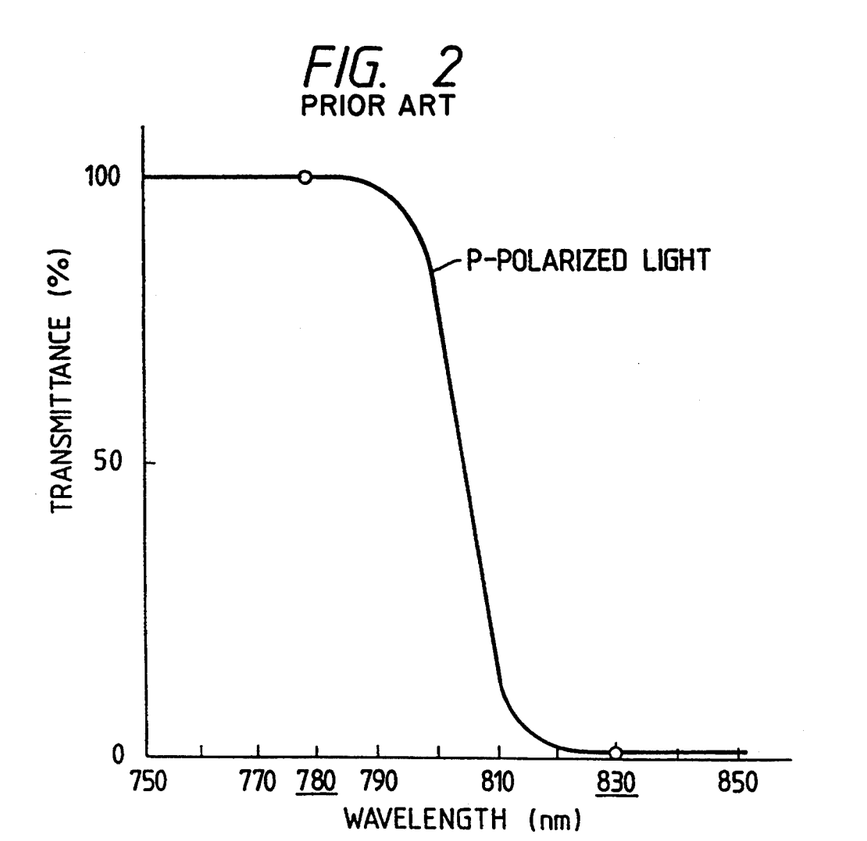
FIG. 2 is a spectral distribution diagram of a dichroic prism 26.
Figure 3:
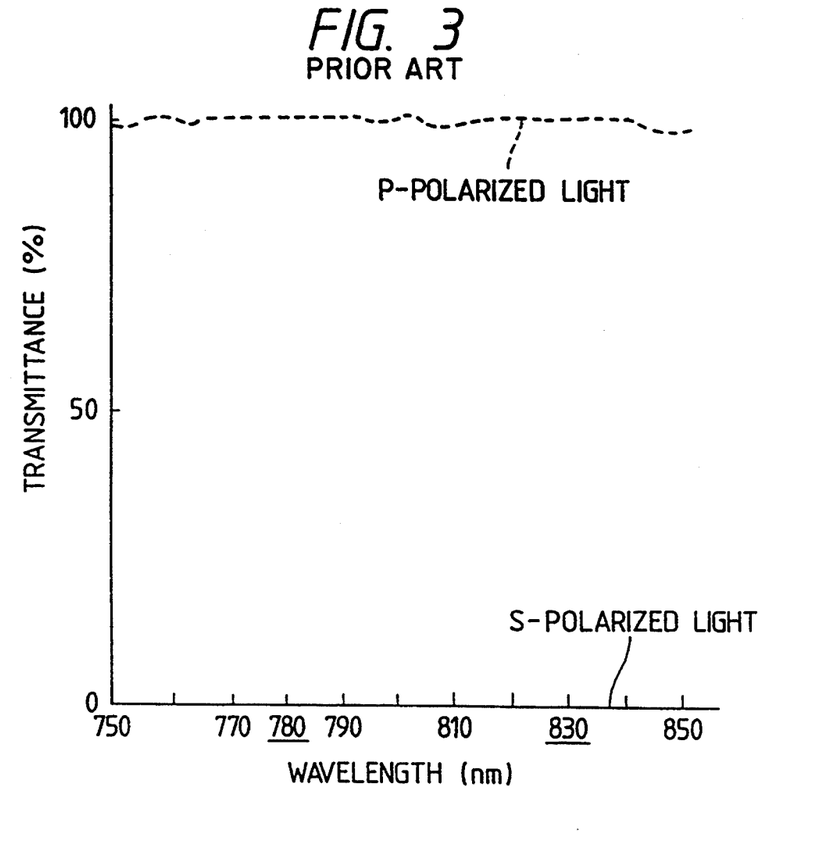
FIG. 3 is a spectral distribution diagram of a polarization beam splitter 28.

An information recording medium used herein (as denoted by reference numeral 1 in FIG. 1) is in the form of a disk or card which is composed of a substrate such as glass and plastic, and a record layer formed thereon. Semiconductor lasers 21, 22 are used as the two light sources in the information recording/reproducing apparatus in order to record information in the information recording medium 1 and to reproduce the information therefrom or in order to reproduce the information at the same time as the recording to verify the recorded information. One laser emits light with a wavelength of 780 nm and the other omits light with a wavelength of 830 nm. Each emitted light is collimated by a collimator lens 23 or 24. The former light passes through a diffraction grating 25 to be split into zeroth-order diffracted light and ±first-order diffracted light, while the latter light directly enters a dichroic prism 26. The prism 26 is so designed that dielectric multilayers layered on a prism bond surface as shown in FIG. 2 transmit the light with a wavelength of 780 nm in the form of a p-polarization component and reflects the light with a wavelength of 830 nm in the form of p-polarization component. Each beam outgoing from the prism 26 passes through a beam shaping prism 27 to be shaped to have a predetermined light distribution. Then the shaped beam enters a polarization beam splitter 28 having the property as shown in FIG. 3 then to enter a quarter-wave plate 29 to be circularly polarized. The circularly polarized beam reaches an objective lens 30. Each beam is converged by the objective lens 30 on the information recording medium 1, so that the light with a wavelength of 780 nm forms three light spots $S_1$ (+first-order diffracted light), $S_2$ (zeroth-order diffracted light) and $S_3$ (−first-order diffracted light), and that the light with wavelength of 830 nm forms a light spot $S_w$.

Figure 4:
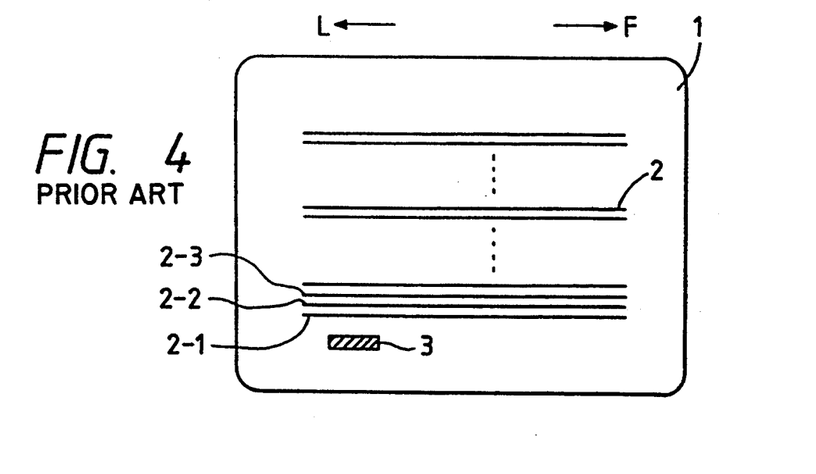
FIG. 4 is a schematic plan view to show a WORM (Write Once Read Many) type card recording medium.
Figure 5:
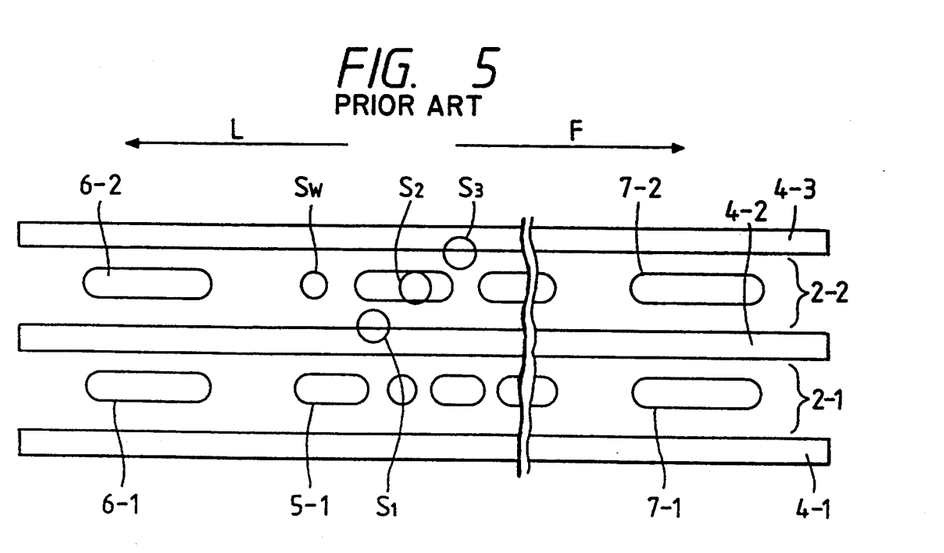
FIG. 5 is a partially enlarged view of FIG. 4.

The light spots are positioned on an information track 2 on the information recording medium 1 in an example of an information recording medium of a card as shown in FIG. 4 and FIG. 5. Specifically, information tracks 2 are arranged from a home position 3 in the order of 2-1, 2-2, 2-3, . . . and tracking tracks 4-1, 4-2, 4-3, . . . are juxtaposed adjacent to the information tracks. Address portions 6-1, 6-2, . . . and 7-1, 7-2, . . . are prepared for track identification on either side of the information tracks. The light spots $S_1$, $S_3$ are positioned on two tracking tracks 4 adjacent to each other, and the light spot $S_2$ on an information track 2 between the two adjacent tracking tracks. Numeral 51 denotes a drive motor for moving the information recording medium 1 forward and backward (in the direction F and in the direction L), which effects a relative reciprocating motion of the information recording medium 1 to an optical head 50 in parallel with the information tracks 2.

Figure 6:
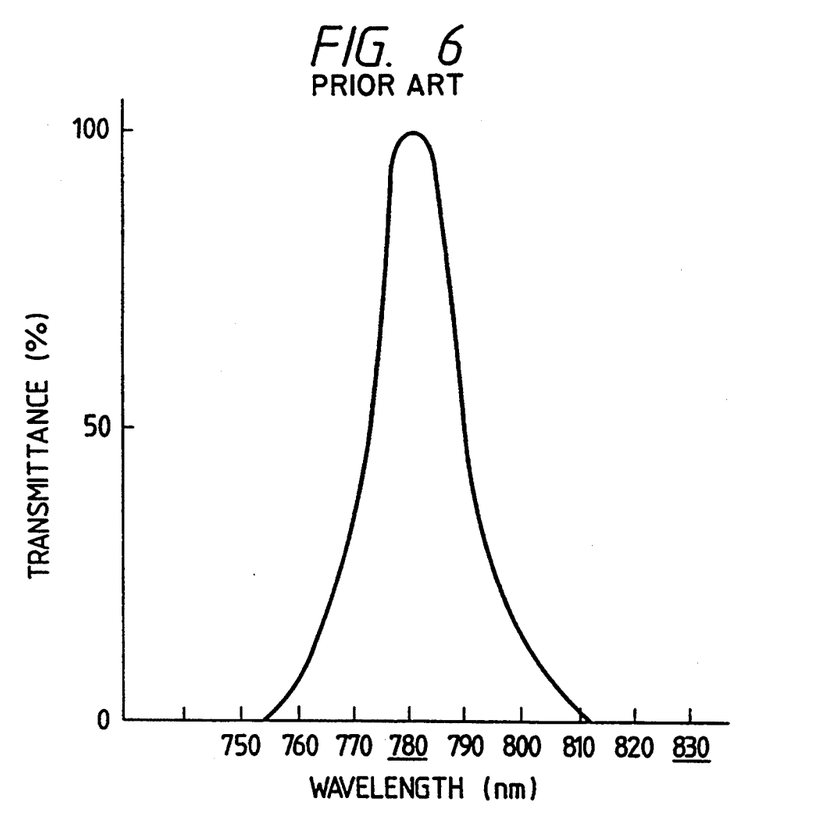
FIG. 6 is a spectral distribution diagram of a film on the surface of toric lens 33.
Figure 7:
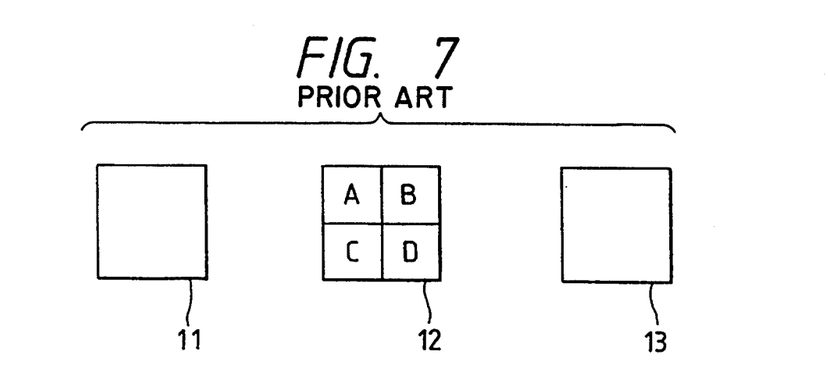
FIG. 7 is an enlarged view to show receptor elements in a photodetector.

Reflected light from the information recording medium passes through the same optical path up to the polarization beam splitter 28 and is then deflected thereby. The deflected light passes through a band pass filter 31 having the property equivalent to that shown in FIG. 2 and then reaches a toric lens 33 having a special film with the property shown in FIG. 6. The toric lens 33 transmits only light with a wavelength of 780 nm, and the transmitted light reaches a photodetector 34. Numeral 32 designates a stopper for receiving light reflected by the band pass filter 31. The photodetector 34 has receptor elements 11, 13 for obtaining tracking control signals and a receptor element 12 sectioned into four segments for detecting focus control signals and reproduction signals, as shown in FIG. 7.

In the conventional example as described, however, the verification is possible only in one direction (in the direction F in FIG. 5) on the reciprocating (moving in the direction F and in the direction L) information recording medium. The verification is impossible in the return direction (in the direction L in FIG. 5), since the reproducing light spot $S_2$ is leading the recording light spot $S_w$.

Also, Japanese Laid-open Patent Application No. 61-240408 discloses an optical information recording/reproducing apparatus which can perform recording and reproduction of information in a relative reciprocating motion between a recording/reproducing apparatus and a recording medium, in which information recorded in the forward motion is read out in the backward direction during return, and the thus read information is compared with information desired to be recorded thereby to check whether information is correctly recorded on the medium.

This method, however, cannot enable the recording and verification of information in both directions in a reciprocating motion of an information recording medium.

SUMMARY OF THE INVENTION

The present invention has been accomplished considering the above circumstances. It is an object of the present invention to provide an optical information recording/reproducing apparatus which can perform recording with verification in both directions in a reciprocating motion of an information recording medium.

In the present invention, an LD array emitting two beams is employed as a light source for forming two recording light spots, and three beams as in the conventional example are shifted in the tracking direction so that the zeroth-order light may be used for AT control (in the push-pull method) and for AF control (in the astigmatic method) and that the ±first-order light beams may be used as two reproducing light spots following the two recording light spots, whereby the recording and verification can be carried out in both the directions, which doubles the recording speed.

In the present invention, an optical information recording/reproducing apparatus has a first light source for information reproduction and second and third light sources for information recording, in which beams emitted from the light sources are guided to irradiate an information recording medium reciprocating relative to the beams and to form light spots on information tracks on the information recording medium thereby to carry out recording and reproduction of information, wherein the relative positional relation between the light spots from the first light source and from the second and third light sources is determined such that a recording light spot is located on each of two information tracks and that two reproducing light spots are obliquely positioned before and after the two recording light spots with respect to the moving direction of the recording medium. The light sources for recording light spots are selectively turned on depending upon the moving direction of the recording medium so that a beam emitted from the light source turned on may be guided to irradiate the information recording medium.

DETAILED DESCRIPTION OF THE PREFERRED EMBODIMENTS

The embodiments of the optical information recording/reproducing apparatus of the present invention will be described in detail with reference to the drawings.

Figure 8:
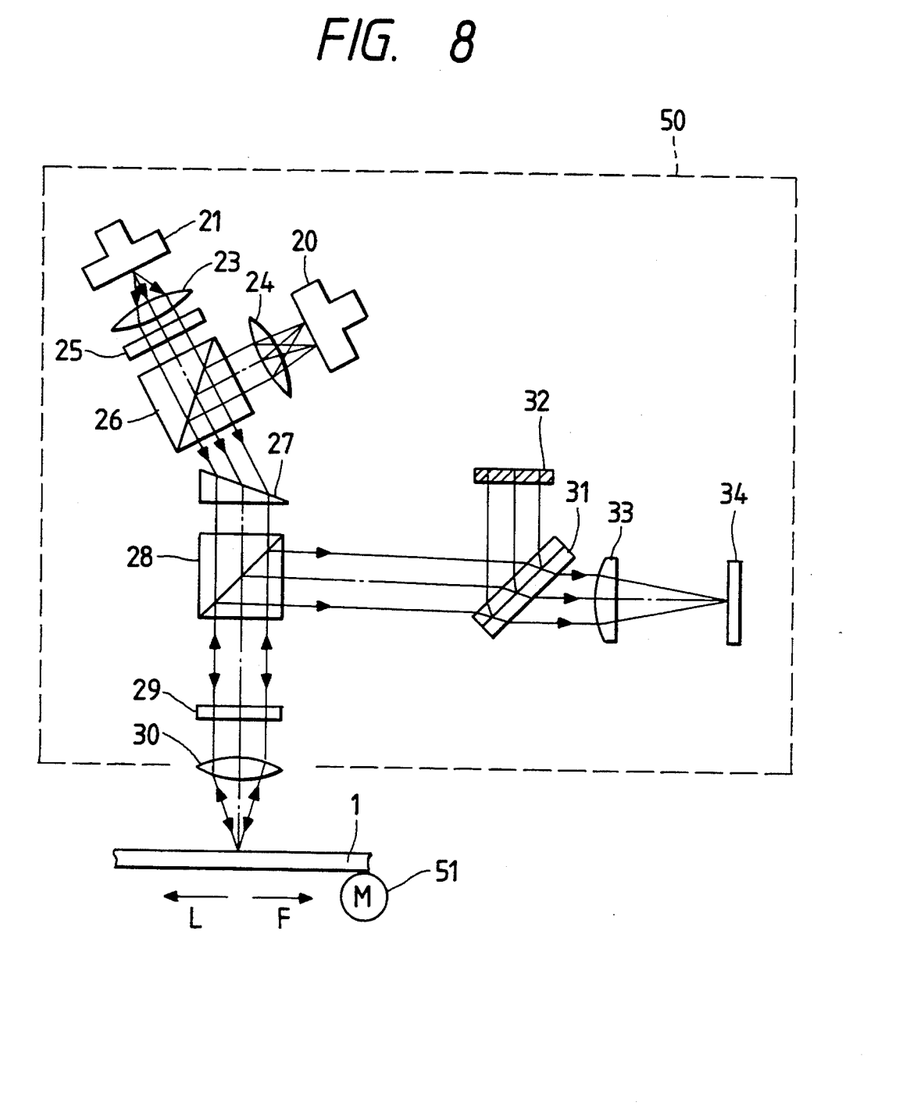
FIG. 8 is a constitutional drawing to show an optical information recording/reproducing apparatus of the present invention.

FIG. 8 is a drawing to illustrate the structure of an optical system in the optical information recording/reproducing apparatus of the present invention. The same reference numerals denote the same members as those in FIG. 1, which are omitted in the explanation herein.

Figure 9:
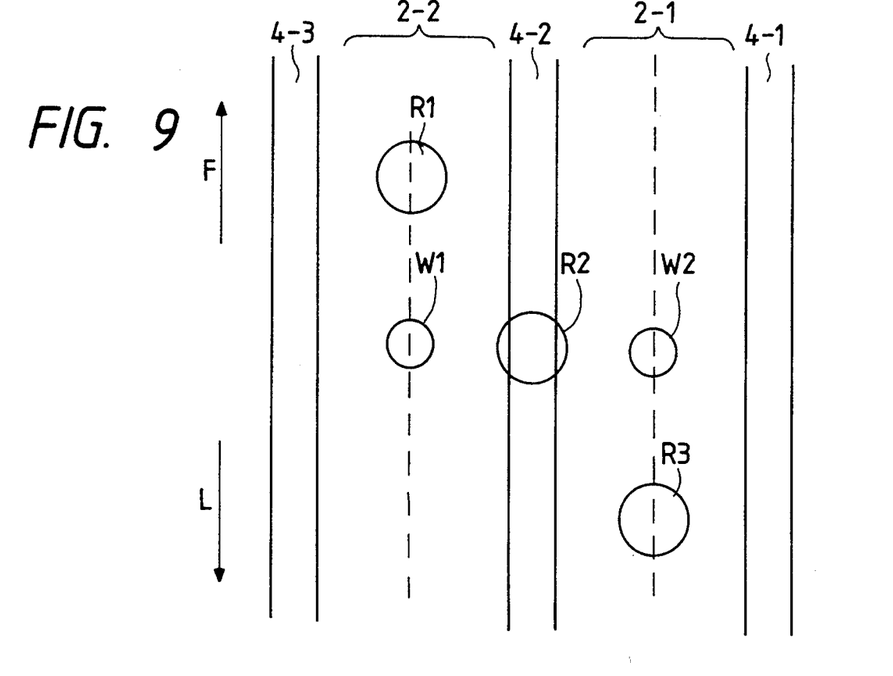
FIG. 9 is a drawing to show an arrangement of light spots in the present invention.

FIG. 9 schematically shows an arrangement of light spots in the present invention. In this example a card information recording medium is employed for explanation purposes, similarly as in FIG. 5. A semiconductor laser 21 emits a beam of 780 nm used for a reproducing light spot, similarly as in FIG. 1. The beam of 780 nm is collimated by a collimator lens 23 and split into three beams by a diffraction grating 25. The three split beams are guided to irradiate an optical card 1 as an information recording medium. The present invention, however, is different from FIG. 1 in that among the three split reproducing light spots a center light spot $R_2$ (zeroth-order light) is located on a tracking track 4-2 and that two remaining reproducing light spots $R_1$, $R_3$ ($\pm$first-order light) are located near the center of information track 2-2 and near the center of information track 2-1, respectively, as shown in FIG. 9.

Three reflected beams from the light spots $R_1$, $R_2$, $R_3$ on the optical card are guided to a photodetector 34, similarly as described with FIG. 1. The three beams respectively enter receptor elements 11, 12, 13 as shown in FIG. 7. The reflected light from light spot $R_2$ entering the quarter-sectioned receptor element 12 is used to obtain control signals for autotracking (as will be referred to as AT) and for autofocus (as will be referred to as AF). In this case, AT is controlled by the generally well-known push-pull method and AF by the astigmatic method. Also, the reflected light from light spots $R_1$, $R_3$ entering the receptor elements 11, 13 is used to detect reproduction signals. As for AF, either or both of the receptor elements 11, 13 may be a quarter-sectioned element or quarter-sectioned elements for AF control. Such an arrangement can remove negative influence of AF offset or card inclination arisen from a height difference between tracking tracks and information tracks, assuring excellent AF properties.

Recording light spots are next described. A semiconductor laser 20 for recording beams has two radiative points to emit rays of 830 nm. Beams from the semiconductor laser 20 are collimated by the collimator lens 24, and the collimated beams pass through the optical components and are converged by the objective lens 30 to irradiate the optical card as an information recording medium, similarly as in FIG. 1. $W_1$ and $W_2$ shown in FIG. 9 are recording light spots, and the arrangement thereof is as shown. As seen from the arrangement in FIG. 9, the light spots $W_1$, $W_2$ are arranged at the center of information tracks 2-2, 2-1 adjacent to each other, and a distance between $W_1$ and $W_2$ is uniquely determined by the distance between the radiative points in the LD array, the collimator lens 24, the objective lens 30, and the beam shaping prism 27.

The operation of recording light spots during recording is briefly described in the following. When the optical card is moved by the drive motor 51 in the direction L in FIG. 9, only the light source in laser 20 corresponding to the light spot $W_2$ is actuated to emit a beam. The emitted beam is converged on the information track 2-1 to effect recording of information therein. The light spot $R_3$ follows the light spot $W_2$ to effect verification of recorded information at the same time. Conversely, when the optical card is moved by the drive motor 51 in the direction F, only the light source in laser 20 corresponding to the light spot $W_1$ is actuated to emit a beam. The emitted beam is converged on the information track 2-2 to effect recording of information therein. The light spot $R_1$ effects simultaneous verification with the recording. After a cycle of forward and backward recording is completed as described, the beams are shifted onto two tracks next to the recorded tracks, on which another cycle of information recording and verification is repeated in the same manner of operation. Accordingly, bi-directional recording and verification can be carried out on the information tracks on the optical card, doubling the recording speed.

As described above, the present invention provides an optical information recording/reproducing apparatus having a first light source (21) for information reproduction and a second light source (20) and a third light source (20) for information recording, in which beams emitted from the light sources are guided to irradiate an information recording medium (1) made reciprocate relative to the beams by the moving means (51) and to form light spots on information tracks on the information record medium thereby to carry out recording and reproduction of information, wherein the relative positional relation between the light spots from the first light source and from the second and third light sources is determined such that a recording light spot is located on each of two information tracks and that a reproducing light spot is located on each of the two information tracks while the reproducing light spots are positioned on either side of the alignment line of the two recording light spots as before and after the alignment line. The light sources (20) for the recording light spots are arranged to be selectively turned on depending upon the moving direction of the recording medium so that a beam emitted from the light source turned on may be guided to irradiate the information recording medium.

In one aspect, the light sources for the recording light spots are selectively turned on such that a corresponding recording light spot is on behind a reproducing light spot with respect to the moving direction of the information recording medium.

In another aspect, the selection timing of a light source to be turned on for a recording light spot is between the time of completion of information recording and the time of a start of next information recording. Namely, the selection is preferably carried out during reversal of the reciprocating motion.

In another aspect, the first light source and the second and third light sources are semiconductor lasers, and the wavelength of the first light source is different from that of the second and third light sources.

In another aspect, the second and third light sources for information recording are arrayed semiconductor lasers.

Figure 10:
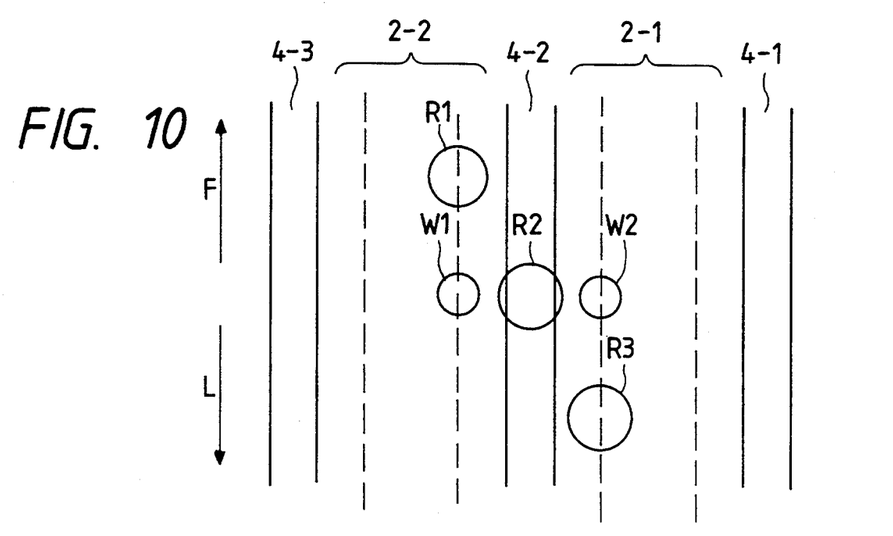
FIG. 10 is a drawing to show an arrangement of light spots in another embodiment of the present invention.

FIG. 10 shows another embodiment of the present invention, in which the arrangement of light spots is modified by changing the distance between radiative points in the LD array (but there is no other change made except for the LD array). This embodiment is effective to double the recording capacity.

In this embodiment, recording and reproduction may be conducted with two lines of information being recorded in each information track (2-1, 2-2).

In a further embodiment, the light with a wavelength of 830 nm used for recording may be also used for reproduction instead of the light with a wavelength of 780 nm for reproduction. Although the two recording light spots are produced by the 2-beam LD array in the present invention, light from a 1-beam LD may also be used by splitting it into two beams by means of an optical component such as a diffraction grating and an acousto-optic element, achieving the same operation and effect. Three (or more) separate light sources may also be employed as an alternative. Further, the recording light spots are located inside the reproducing light spots with respect to the moving direction of the optical card in the present invention, but the recording light spots may be located outside the reproducing light spots with the same operation and effect.

The present invention is described above in detail, which enables information recording and verification in both the directions in a reciprocating motion of an information recording medium, whereby the recording speed may be doubled.

What is claimed is:

1. An optical information recording/reproducing apparatus comprising: first spot forming means for forming a first recording light spot and a second recording light spot for recording information on an information recording medium;

second spot forming means for forming a first reproducing light spot and a second reproducing light spot for reproducing information on the information recording medium; and moving means for effecting a relative reciprocating motion between said first and second spot forming means and the information recording medium, wherein said first spot forming means forms the first recording light spot and the second recording light spot and said second spot forming means forms the first reproducing light spot and the second reproducing light spot such that a line linking the first and second recording light spots intersects a line linking the first and second reproducing light spots.

2. An optical information recording/reproducing apparatus according to claim 1, wherein the first recording light spot and the first reproducing light spot are located on a first information track of the information recording medium and the second recording light spot and the second reproducing light spot are located on a second information track different from the first information track of the recording medium.

3. An optical information recording/reproducing apparatus comprising:

first recording/reproducing means for forming a first recording light spot for recording of information and a first reproducing light spot for reproduction of information on a first information track of an information recording medium;

second recording/reproducing means for forming a second recording light spot for recording of information and a second reproducing light spot for reproduction of information on a second information track different from the first information track of the information recording medium; and moving means for effecting a relative reciprocating motion between said first and second recording/reproducing means and the information recording medium, wherein said first recording/reproducing means forms the first recording light spot and the first reproducing light spot and said second recording/reproducing means forms the second recording light spot and the second reproducing light spot such that the first reproducing light spot is located at a side opposite to the second reproducing light spot with respect to a line linking the first recording light spot with the second recording light spot.

4. A recording and reproduction method in an optical information recording/reproducing apparatus, said method comprising the steps of:

using an optical head for forming a first recording light spot and a first reproducing light spot for recording and reproduction of information on a first information track of an information recording medium;

using the optical head for forming a second recording light spot and a second reproducing light spot for recording and reproduction of information on a second information track different from the first information track of the information recording medium; and effecting a relative reciprocating motion between the optical head and the information recording medium, wherein the optical head forms the first recording light spot and the first reproducing light spot and the second recording light spot and the second reproducing light spot such that a line linking the first and second recording light spots intersects a line linking the first and second reproducing light spots.

5. An optical information recording/reproducing apparatus comprising:

first beam generating means for generating first and second recording light beams;

second beam generating means for generating first and second reproducing light beams;

optical combining means for causing travelling directions of the light beams from said first and second beam generating means to be substantially coincident with one another;

converging means for converging the light beams from said optical combining means on a recording medium as a plurality of light spots; and light receiving means for receiving light beams from the recording medium.

6. An apparatus according to claim 5, wherein said first beam generating means comprises a semiconductor laser having a plurality of light emitting points.

7. An apparatus according to claim 5, wherein said second beam generating means comprises a semiconductor laser and a diffraction grating for dividing a light beam from said semiconductor laser into a plurality of light beams.

8. An apparatus according to claim 5, wherein said beam combining means comprises a dichroic prism and the light beams generated by said first beam generating means have wavelengths different from those of the light beams generated by said second beam generating means.

9. An apparatus according to claim 5, wherein the plurality of light spots formed by said converging means are a first reproducing light spot, a second reproducing light spot, a first recording light spot and a second recording light spot, which are arranged such that the first reproducing light spot is located at a side opposite to the second reproducing light spot with respect to a line linking the first recording light spot with the second recording light spot.

10. A recording and reproducing method in an optical information recording/reproducing apparatus, said method comprising the steps of:

generating first and second recording light beams;

generating first and second reproducing light beams;

causing travelling directions of the first and second recording light beams and the first and second reproducing light beams to be substantially coincident with one another;

converging the recording and reproducing light beams on a recording medium as a plurality of light spots; and receiving light beams from the recording medium.

11. A method according to claim 10, wherein said light beam generating steps comprise a step of generating a single light beam and a step of diffracting the single light beam so as to be divided into a plurality of light beams by a diffraction grating.

12. A method according to claim 10, wherein the plurality of light spots formed in said converging step are first and second recording light spots and first and second reproducing light spots, which are arranged such that the first reproducing light spot is located at a side opposite to the second reproducing light spot with respect to a line linking the first recording light spot with the second recording light spot.

13. A recording and reproducing method in an optical information recording/reproducing apparatus, said method comprising the steps of:

using an optical head for forming a first recording light spot for recording information and a first reproducing light spot for reproducing information on a first information track of an information recording medium;

using the optical head for forming a second recording light spot for recording information and a second reproducing light spot for reproducing information on a second information track different from the first information track of the information recording medium; and effecting a relative reciprocating motion between the optical head and the information recording medium, wherein the optical head forms the first recording light spot and the first reproducing light spot and the second recording light spot and the second reproducing light spot such that the first reproducing light spot is located at a side opposite to the second reproducing light spot with respect to a line linking the first recording light spot with the second recording light spot.

14. An optical information recording/reproducing apparatus comprising:

first beam generating means for generating a plurality of recording light beams, said first beam generating means comprising a first semiconductor laser having a plurality of light emitting points;

second beam generating means for generating a plurality of reproducing light beams, said second beam generating means comprising (i) a second semiconductor laser having a single light emitting point and (ii) a diffraction grating for dividing a light beam from the light emitting point of said second semiconductor laser into a plurality of light beams;

optical combining means for causing travelling directions of the light beams from said first and second beam generating means to be substantially coincident with one another;

converging means for converging the light beams from said optical combining means onto a recording medium as a plurality of light spots; and light receiving means for receiving light beams from the recording medium.

* * * * *

UNITED STATES PATENT AND TRADEMARK OFFICE
CERTIFICATE OF CORRECTION

PATENT NO. : 5,444,224
DATED : August 22, 1995
INVENTOR(S) : MORITOSHI MIYAMOTO

It is certified that error appears in the above-indentified patent and that said Letters Patent is hereby corrected as shown below:

COLUMN 1:

Line 9, "an for" should read --for an--.
    Line 47, "reflects" should read --reflect--.

COLUMN 5:

Line 4, "reciprocate" should read --to reciprocate--.
    Line 30, "next" should read --a next--.

COLUMN 6:

Line 5, "comprising: first" should read --comprising: ¶ first--.

Signed and Sealed this

Twelfth Day of December, 1995

Attest:

BRUCE LEHMAN

Attesting Officer    Commissioner of Patents and Trademarks